United States Patent [19]

Payne

[11] Patent Number: 4,568,016
[45] Date of Patent: Feb. 4, 1986

[54] WAVE SOLDER WEIR ARRANGEMENT WITH CONSTANT SOLDER HEAD

[75] Inventor: Charles H. Payne, Garland, Tex.

[73] Assignee: AT&T Technologies, Inc., Berkeley Heights, N.J.

[21] Appl. No.: 654,587

[22] Filed: Sep. 26, 1984

[51] Int. Cl.[4] ............................................... B23K 1/00
[52] U.S. Cl. ................................... 228/180.1; 228/37
[58] Field of Search ............................... 228/37, 180.1

[56] References Cited

U.S. PATENT DOCUMENTS

| 3,151,592 | 10/1964 | Wegener | 228/37 |
| 3,158,171 | 11/1964 | Eckert | 137/262 |
| 3,989,180 | 11/1976 | Tardoskegyi | 228/180 R |

FOREIGN PATENT DOCUMENTS 317477 12/1971 U.S.S.R. ............................... 228/37

OTHER PUBLICATIONS

S. Kostick, J. R. Murray and R. J. Noreika,—Wave Solder Chimney, *IBM Technical Disclosure Bulletin*—vol. 22, No. 9, Feb. 1980, pp. 3984 & 3985.

*Primary Examiner*—Nicholas P. Godici
*Assistant Examiner*—Karen Skillman
*Attorney, Agent, or Firm*—R. P. Miller; M. de Picciotto

[57] ABSTRACT

Parts (10) to receive a thin strip of solder are advanced along top surfaces of a pair of upwardly inclined channel plates (26, 27). Pressurized solder (31) is pumped between the plates to a precise head which projects as a meniscus (28) above the top surfaces of the channel members and is deposited on the advancing parts. The head of solder is maintained at a height to insure a partial flow of solder through a V-shaped trough (51). Any fluctuations in the height of head of solder is rapidly compensated by an increased or decreased flow of solder through the trough. A significant reservoir of solder is maintained between the channel plates so that the solder is held at a substantially constant temperature.

10 Claims, 8 Drawing Figures

WAVE SOLDER WEIR ARRANGEMENT WITH CONSTANT SOLDER HEAD

FIELD OF INVENTION

This invention relates to a method of and apparatus for controlling a solder stream to apply a solder stripe of precise width to an advancing article, and more particularly to methods and facilities for maintaining constant the level of a pumped head of solder which is applied to the advancing article.

BACKGROUND OF THE INVENTION

Many apparatuses have been developed to apply a coating of solder to the underside of an advancing substrate, such as a printed circuit board for the purpose of solder bonding elements mounted on or projecting through the board to metallic circuit paths or pads on the board. In certain manufacturing processes it is necessary that the solder stream or wave be applied as a thin stripe along the undersurface of the advancing substrate. In one such process, a connector housing is mounted on one edge of a circuit board with projecting connector terminals overlaying and mechanically engaging metallic circuit pads adhered to the circuit board. The board is then placed in a conveyor fixture and advanced through a solder wave having a width sufficient to lay a stripe of molten solder on the overlaying terminals and contact pads to effectuate the solder bonding of the terminals to the contact pads.

In copending patent application Ser. No. 481,088, filed Mar. 3, 1983, in the names of W. C. Kent and C. H. Payne now U.S. Pat. No. 4,527,731, there is disclosed methods and apparatus for applying solder stripes to mechanically assembled connectors and printed circuit boards. More specifically in this copending application a connector is assembled on one edge of a small printed circuit board with the connector terminals overlaying circuit board contact pads whereafter the assembled board and connector are advanced along the inclined top surfaces of a pair of channel members constructed of non-solder wetting material. A solder stream is created by pumping a series of contiguous solder jets which are flowed between the channel members so that the top of the stream forms a meniscus projecting above the level of the tops of the inclined channel members to apply a thin solder stripe to the overlaying terminals and metallic contact pads.

The instant application utilizes similar apparatus but is concerned with more precisely maintaining the temperature of and the height of the solder stream. With variations in temperature, non-uniform solder bonds are often encountered and with variations in the height of the solder stream, there are possibilities of the solder stream overflowing the channel members and flowing onto sections of the circuit board that must be maintained free of solder. Accordingly, the present invention provides a method of more precisely controlling the temperature of the molten solder as well as controlling the height of the solder stream to insure application of sufficient solder while preventing solder overflow and subsequent damage to the circuit board and any electrical components mounted therein.

SUMMARY OF THE INVENTION

The present invention contemplates, among other things, a solder stripe applying apparatus and a method wherein molten solder is pumped and maintained at a constant head level and temperature so as to flow between channel members in such a fashion that the top of the solder head forms a meniscus with respect to the tops of the channel members through which articles to receive a solder stripe may be passed.

More particularly, a narrow solder wave is formed by pumping solder through a well into a narrow space between a pair of channel defining members constructed of non-solder wetting metal. The tops of the channel members extend along an upward incline so that a downwardly running stream of solder is flowed between the channel members. The pumping action is controlled so that the top of the solder stream forms a meniscus projecting beyond the top surface of the channel members. Each article to be soldered is conveyed along in abutting relation to the tops of the channel members whereupon the meniscus acts to deposit a finite stripe of solder to the underside of the conveyed article. Stream directing elements are interposed between the channel members in spaced relation to provide a relatively long head of solder which is maintained at a substantially uniform temperature.

Compensation for fluctuations in the height of the pump solder head is attained by providing a laterally extending overflow discharge chute that opens into a slot formed in one of the channel members. The chute is formed with a V-shaped cross section. The chute is positioned at a level so that solder is continually exited through the V-shaped chute. Variations in the solder head are encountered as a result in fluctuations in the operation of the pump and also when the articles are conveyed into and out of the solder meniscus. Any increase in the height of the solder head results in a substantial increase in the amount of solder flowed through the chute. Similarly, when the solder head drops, there is a rapid decrease in the amount of solder exited through the chute.

DESCRIPTION OF DRAWING

Other features and advantages of the present invention will be apparent upon consideration of the following detailed description when considered in conjunction with the drawing wherein.

DETAILED DESCRIPTION

Figure 1:
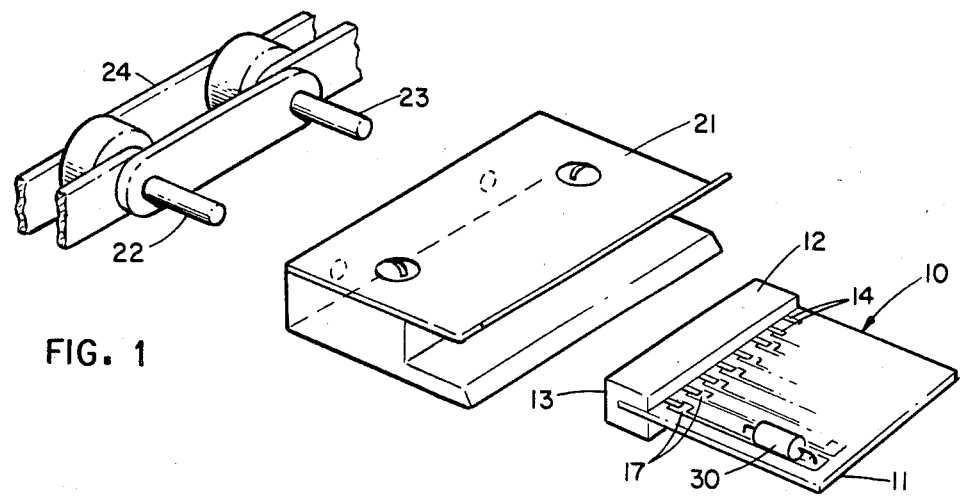
FIG. 1 is an exploded perspective view of a section of a conveyor for transporting an article such as a printed circuit board to receive a stripe of solder.
Figure 2:
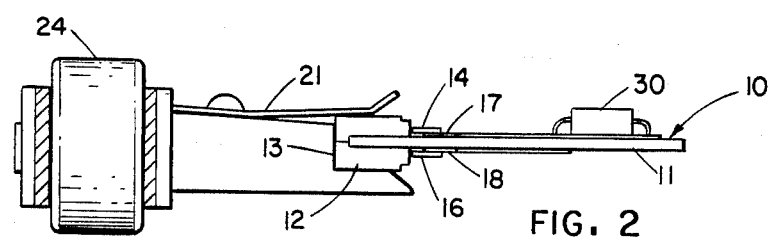
FIG. 2 is a side view of a printed circuit board positioned in a conveyor carrier.

In order to illustrate the invention and referring to FIGS. 1 and 2, there is shown a small connector 10 which comprises a printed circuit board 11 in a housing 12 having an array of sockets (not shown) formed in a front face 13. Projecting from the back of the housing are two banks of spaced terminals 14 and 16 which mechanically overlay contact pads 17 and 18 formed along opposite edge sections of the printed circuit board. It is an object of the present invention to apply a finite stripe of solder to bond the overlaying terminals to the contact pads. An apparatus for accomplishing a similar result is disclosed in the above-identified W. C. Kent and C. H. Payne patent. More particularly, the present invention is concerned with controlling the length and height of a solder wave or stream to improve the deposits of the solder stripe on the overlaying terminals and contact pads. It is to be understood however, that the invention may be utilized in any instance where it is desired to lay a stripe of solder on an article wherein the stripe is to be of uniform consistency and geometrical size.

Figure 3:
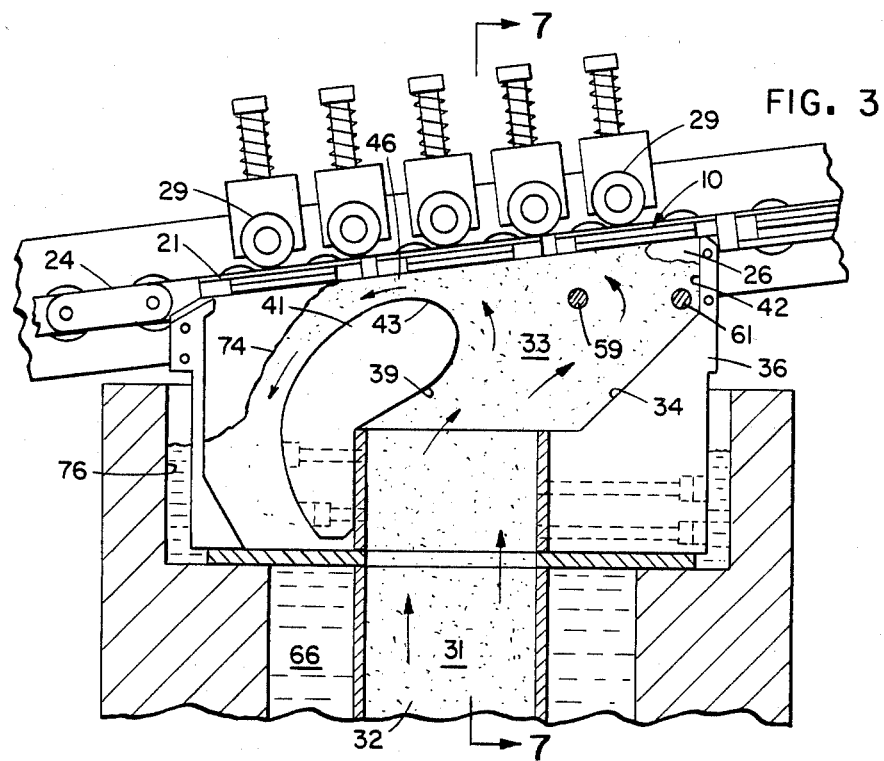
FIG. 3 is a side view of a soldering apparatus with a side panel removed to illustrate the flow of a pumped stream of solder that is applied to the conveyed circuit boards.
Figure 4:
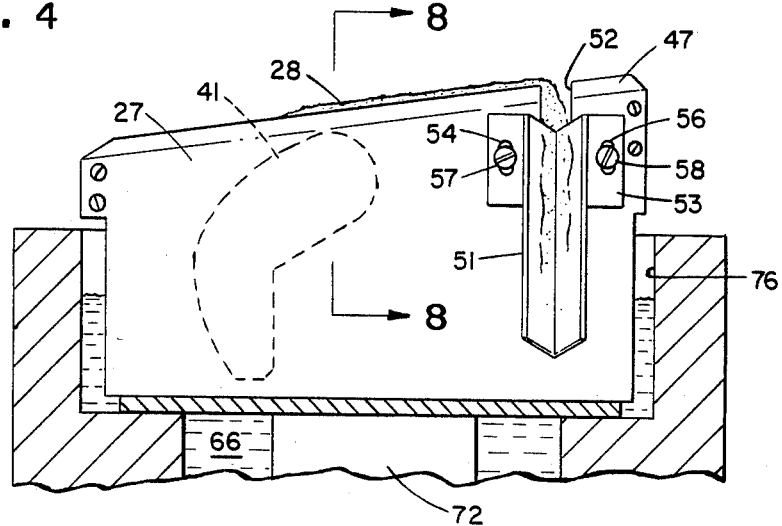
FIG. 4 is another side view showing a V-shaped solder discharge trough or chute for receiving overflow solder to maintain the height of the stream solder at a constant level in accordance with the principles of the present invention.
Figure 5:
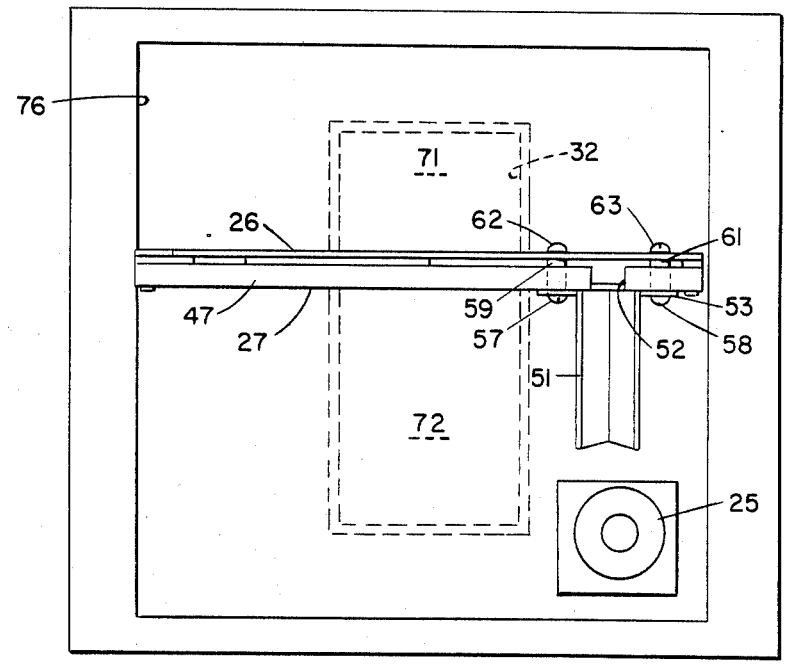
FIG. 5 is a top view of the solder applying apparatus, particularly showing a pair of channel members between which the solder stream is directed together with the discharge chute.
Figure 8:
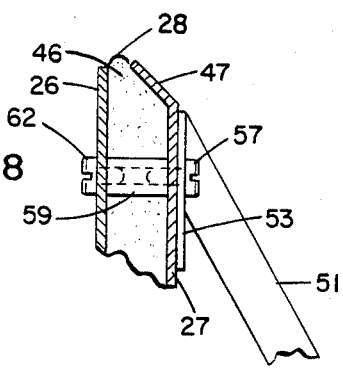
FIG. 8 is a sectional view taken along line 8—8 of FIG. 5 showing the meniscus of solder projecting above the top edges of the channel members.
Figure 7:
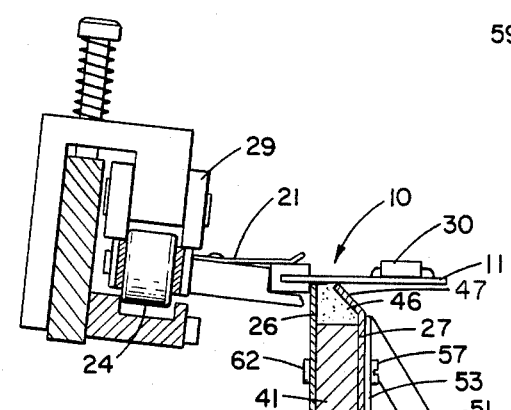
FIG. 7 is a sectional view taken along line 7—7 of FIG. 3 depicting a conveyor held printed circuit board being advanced along the channel members and through a meniscus of solder.
Figure 7:
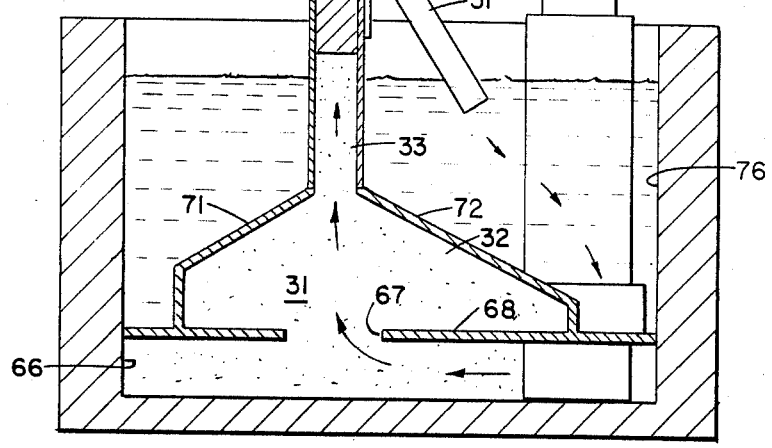

As more completely described in the above-identified Kent-Payne patent, the assembled connector is placed in a spring-clip holder or fixture 21 which is mounted on and secured to pins 22 and 23 projecting from a conveyor chain 24. The conveyor (see FIG. 3) advances a series of clip holders 21 with the assembled connectors along the inclined tops of a pair of channel defining thin plates or members 26 and 27 (see also FIGS. 4 and 5). A commercial solder pump 25 impresses an elongated head of solder into the channel. The channel members are constructed of a material, such as titanium which does not have an affinity for solder so that a stream of solder flows within the channel as shown in FIGS. 3, 7 and 8 in a way that the top of the stream is repelled by the titanium to form a convex meniscus 28 (see FIG. 8). This meniscus is of considerable length and projects slightly above the tops of the channel members 26 and 27. It is through this projecting convex meniscus that the terminals and contact pads are moved to receive a coating of solder. As the conveyor advances the clips and the circuit boards, the overlaying terminals slide along the upwardly inclined top surface of the thin plates 26 and 27 while a series of spring loaded rollers 29 engage the conveyor chain links and press the circuit boards so that the terminals 16 are maintained in firm contact with the tops of the channel plates 26 and 27.

With the illustrated construction a long stream of solder is provided and the deposit of sufficient solder is assured. Further, the long solder stream permits the conveyor to be advanced at a rapid rate and there will be still a deposit of sufficient solder to insure good solder bonds between the terminals and the contact pads. In the operation of a system of this type, there are fluctuations in the amount of solder pumped into the channel and as a consequence, when excess of solder pumped, there is a possibility of lateral overflow of the solder over the tops of the channel plates 26 and 27 and onto the circuit boards. Such overflowing solder may flow onto sections of the printed circuit board so as to form solder bridges between the circuit pads or electrical components 30 mounted on the board resulting in the production of defective board connectors.

Considering the new structure of the solder applying facilities and referring to FIGS. 3 and 7, molten solder 31 is forced by the pump 25 through a well 32 into a chamber 33 defined by an inclined wall 34 of a first side plate 36 and a lower inclined section 39 of a second side plate 41. An upper portion of a chamber 33 is further defined by a vertical wall 42 extending from the first plate 36 and an arcuate weir surface 43 of the second plate 41. A pumped mass of solder is forced upwardly through the well and the chamber 33 and forms a head of solder. The solder flows between the channel defining plates 26 and 27 as an extended solder stream 46. This solder stream is relatively narrow being of a width sufficient to maintain the meniscus 28 to apply a stripe of solder of precise width to the overlaying terminals and the contact pads on the conveyed circuit board.

Figure 6:
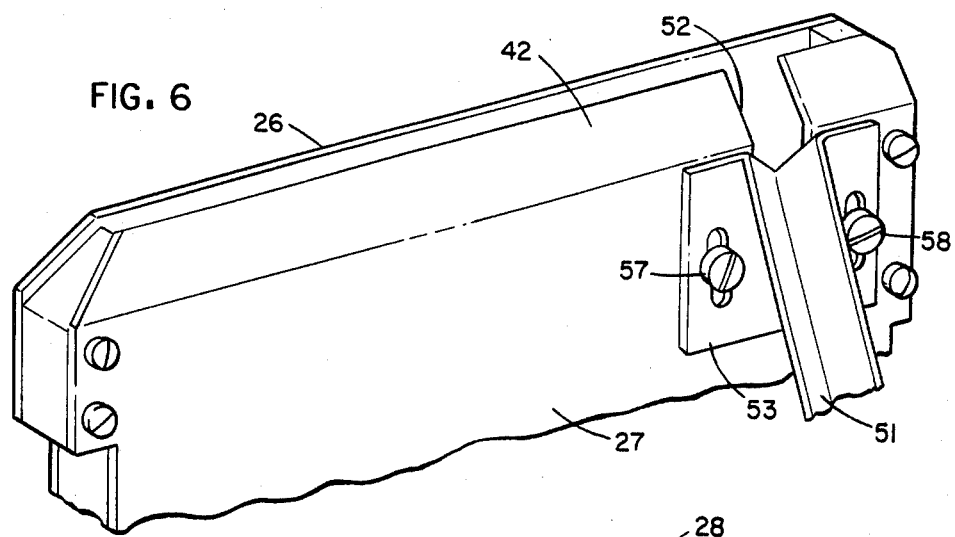
FIG. 6 is a perspective view of the channel members showing one member beveled towards the other and the discharge chute mounted on an adjustable plate for setting the height of the discharge chute to maintain the head of solder at a desired level.

Looking at FIGS. 6, 7 and 8 it will be noted that the titanium channel defining plate 27 is formed with a beveled section 47 projecting towards the straight channel plate 26. The channel plate 27 is secured to one or both of the side plates 41 and 36 by screws seated through elongated slots (not shown). By releasing the screws and moving the channel plate 27 up or down the height of the convex meniscus of solder stream may be adjusted a slight amount to insure the maximum deposit of solder on the conveyed terminal and contact pads. It will be also observed that, with the illustrated wall construction of the solder chamber 33, a relatively large mass of solder is available for maintaining the length of the solder stream between the channel members. This large mass of solder also insures that the temperature remains relatively constant. In order to sustain the head of solder at a constant level between the channel members and thus prevent the overflow of solder onto the circuit board, a special discharge chute or trough 51 (see FIGS. 4, 5, 6 and 7) is provided. The trough is constructed of a non-solder wetting material such as titanium or stainless steel and is formed with a V-shaped configuration. The beveled section 47 of channel member 27 is cut to provide an exit opening 52 leading to the top of the trough. The upper end of the trough is cut at an obtuse angle and secured to a mounting plate 53 provided with a pair of elongated slots 54 and 56 for receiving screws 57 and 58 which are seated in internally threaded spacers 59 and 61. Second screws 62 and 63 are provided to lock the spaces 59 and 61 in position. Upon release of the screws the mounting plate 53 and the trough 51 can be adjusted upward or downward to thereby provide a means for adjusting the height of the solder head and the length of stream flowing between the channel members.

In operation, the trough is positioned so that there is a constant flow of solder into the trough. It may be thus appreciated that the solder flows in two directions. A substantial portion of the solder flows along the channel defined by the plates 26 and 27 and over the weir section 43 of the plate 41 while a smaller portion of the solder flows in a lateral direction into the trough 51. Due to the V-shaped configuration of the trough, any rise in the solder head causes a progressive greater amount of solder to flow into the trough 51 while any decrease in the solder head causes a progressive lesser amount of solder to flow into the tough.

Briefly recapitulating on the method and the operation of the solder applying apparatus and referring to FIGS. 3 and 7, solder is pumped through a lower sump 66 and an elongated slot 67 in a lower base plate 68 supporting the structural elements of the well 32. Pressurized solder flows up through the well 32 and chamber 33 into the channel defined between side plate members 26 and 27. It will be noted that the well is formed with oppositely tapered upper walls 71 and 72 that converge and direct the pressurized solder into the chamber 33. The solder is pumped at a rate so that a substantial portion of the head of the solder projects slightly above the tops of the channel members as a meniscus. The height of the head of solder is determined by the height of the weir section 43 and the position of the lateral discharge trough 51. Solder flowing over the weir section 43 flows down a discharge passage 74 into a solder sump 76 surrounding the well 32 whereafter the solder is routed to the pump 25. The molten solder also flows at right angles from the upper section of the solder stream into the trough 51 which flows the solder into the sump 76. Whenever there are fluctuations in the head of solder, due to variation in pump pressure, entry and exits of the circuit boards into and out of the meniscus or other causes, there is consequent increase or decrease of the solder flow through the V-shaped trough. The V-shaped configuration insures the rapid discharge of excess solder as well as a decrease in solder flow through the chute 51 upon any tendency of a drop in the height of the solder head, so that the solder head is maintained at a constant level. More particularly, the solder flow varies geometrically in response to changes in the height of the solder head with a substantially greater solder flow through the chute with each increment of increase in height of the solder head and a substantially lesser flow with each increment of decrease in the height of the solder head so that the integrity of the meniscus is maintained. As a result, the conveyed terminals and contact pads receive a uniform deposit of solder which when subsequently cooled provide uniform solder bonds to secure the terminals to the contact pads. Further, it will be again appreciated that the provision of the large chamber 33 allows for the presence of a relatively large mass of solder so that the solder stream is maintained at a substantially constant temperature and, thus, the resultant solder bonds are of substantially identical consistency.

What is claimed is:

1. An apparatus for applying a stripe of solder to an article, which comprises:
    a well for receiving solder;
    means for pumping molten solder up through said well;
    a pair of channel plates constructed of non-solder wetting material for receiving said pumped solder and flowing said solder between said plates, said plates being spaced apart a distance to maintain a meniscus of solder having a meniscus width corresponding to the width of the stripe of solder to be applied to the article;
    means for advancing the article along the tops of said channel plates and through said meniscus of solder to receive a solder stripe; and
    a trough projecting laterally from one of said plates for diverting a portion of said solder stream to accommodate fluctuations in the height of the solder stream.

2. An apparatus as defined in claim 1 wherein said trough has a V-shaped cross section.

3. An apparatus as defined in claim 1 wherein the tops of said channel plates are at an incline and said advancing means moves the articles up the inclined tops of said plates.

4. An apparatus as defined in claim 1 wherein one of said plates is beveled toward the other plate and said beveled plate has a slot formed therein to exit the diverted portion of said solder stream into said trough.

5. An apparatus as defined in claim 1, which comprises:
    a first chamber defining plate mounted between said channel plates and having an upright section interposed between the upper sections of said channel plates; and
    a second chamber defining plate mounted between and at lower sections of said channel plates and spaced from said second plate to define a chamber for receiving the solder being pumped into said stream, said second chamber defining plate having an arcuate upper surface at a level below the top of said upright section of said first chamber defining plate, said plates being mounted to direct the solder flow from said chamber between said channel plates and over said arcuate surface.

6. An apparatus for applying a solder stripe to an undersurface of a printed circuit board; which comprises:
    a pair of vertical thin channel plates constructed of non-solder wettable material, a first of said channel plates having a beveled top section angularly projecting toward the top edge of said other plate to define a channel with an open gap corresponding in width to the width of the solder stripe to be applied to the article, said side plates having top edges thereof extending along an upwardly extending incline;
    a first member interposed between said channel plates on the down side of said inclined edges having an arcuate top surface defining a weir and a side surface forming one wall of a chamber;
    a second member interposed between said channel plates and having a side surface extending above the level of said weir to define with said wall and said channel plates the chamber;
    means for pumping molten solder up through said chamber to overflow said weir and establish a head of solder having a top surface of which projects as a meniscus above the top edges of said channel plates;
    a trough extending laterally from an upper section of said beveled section of said first channel plate for receiving a portion of the solder pumped through the chamber and into the space between said channel plates to maintain the head of solder at a level to establish and maintain the meniscus of solder; and
    means for advancing the printed circuit board along the top inclined edges of said channel plates to move into the meniscus of solder whereupon the displaced solder is exited through said trough.

7. An apparatus as defined in claim 6 wherein said trough is formed with a V-shaped cross section to provide a solder exit which varies in effective cross section area for solder flow in a geometrical proportion to increases and decreases in the height of the level of the head of solder.

8. An apparatus as defined in claim 7 which includes:

a mounting plate for supporting said trough; and means for selectively securing said mounting plate relative to the top edges of said channel plates to set the level of the head of solder.

9. A method of applying a stripe of molten solder to an advancing substrate, which comprises:

advancing the substrate along the top surfaces of a pair of spaced channel defining members; each of said members being constructed of a non-solder wetting metal;

pumping a stream of solder between said channel members and along said channel members in a direction opposed to the direction of advance of said substrate to form solder head having a height to form a meniscus projecting above the top surfaces of said channel members whereupon said advancing substrate is advanced through said meniscus of solder; and laterally directing a portion of said solder stream away from said channel to maintain the integrity of the meniscus upon fluctuations in the flow of the pumped stream of solder.

10. As method as defined in claim 9 wherein said directing step encompasses directing a larger portion of the solder stream as the height of the stream increases and directing a smaller portion of the solder stream as the height of the stream decreases.

* * * * *